(12) United States Patent
Gustafson

(10) Patent No.: US 9,863,549 B2
(45) Date of Patent: Jan. 9, 2018

(54) VISUAL RAM POSITION INDICATOR APPARATUSES AND METHODS

(71) Applicant: Hydril USA Distribution, LLC, Houston, TX (US)

(72) Inventor: Ryan Cheaney Gustafson, Houston, TX (US)

(73) Assignee: HYDRIL USA DISTRIBUTION, LLC, Houston, TX (US)

( * ) Notice: Subject to any disclaimer, the term of this patent is extended or adjusted under 35 U.S.C. 154(b) by 0 days.

(21) Appl. No.: 14/942,732

(22) Filed: Nov. 16, 2015

(65) Prior Publication Data
US 2016/0069472 A1 Mar. 10, 2016

Related U.S. Application Data

(63) Continuation of application No. 13/324,029, filed on Dec. 13, 2011, now Pat. No. 9,188,241.

(51) Int. Cl.
*F16K 37/00* (2006.01)
*E21B 33/06* (2006.01)
*E21B 33/064* (2006.01)

(52) U.S. Cl.
CPC ........ *F16K 37/0016* (2013.01); *E21B 33/062* (2013.01); *E21B 33/063* (2013.01);
(Continued)

(58) Field of Classification Search
CPC ............. F16K 37/0008; F16K 37/0016; E21B 33/062; E21B 33/063; Y10T 137/8225;
(Continued)

(56) References Cited

U.S. PATENT DOCUMENTS 1,328,876 A * 1/1920 Hill .................. G01L 7/104
73/729.1
3,154,651 A 10/1964 McKown
(Continued)

FOREIGN PATENT DOCUMENTS

CN 201599005 U 10/2010
EA 200970775 2/2010
(Continued)

OTHER PUBLICATIONS

European Search Report and Opinion issued in connection with corresponding EP Application No. 12195192.5 dated Nov. 11, 2015.
(Continued)

*Primary Examiner* — Atif Chaudry
(74) *Attorney, Agent, or Firm* — Hogan Lovells US LLP

(57) ABSTRACT

Apparatuses for providing a visual indication outside a blowout preventer (BOP) relative to a position of ram blocks inside the BOP, and methods of adding such apparatuses to existing blowout preventers are provided. An apparatus has an indicator rod, a detectable portion and a sealing assembly. The indicator rod has an end extending outside an end cap of the BOP, and is configured to engage with a tail rod of a ram block of the BOP, and to switch between a first position when the BOP is in a close state, and a second position when the BOP is in an open state. The detectable portion is located outside the end cap and is configured to provide a visual indication relative to a current position of the indicator rod. The sealing assembly is configured to seal a space inside the end cap from an environment in which the BOP operates.

17 Claims, 7 Drawing Sheets

(52) U.S. Cl.
CPC ........ *E21B 33/064* (2013.01); *F16K 37/0008* (2013.01); *F16K 37/0058* (2013.01); *Y10T 29/49826* (2015.01); *Y10T 137/8158* (2015.04); *Y10T 137/8225* (2015.04); *Y10T 137/8275* (2015.04); *Y10T 137/8292* (2015.04); *Y10T 137/8309* (2015.04)

(58) Field of Classification Search
CPC ......... Y10T 137/8275; Y10T 137/8292; Y10T 137/8309
USPC ..... 116/285, 277, 284; 137/553, 556, 556.3, 137/556.6
See application file for complete search history.

(56) References Cited

U.S. PATENT DOCUMENTS

| | | |
|---|---|---|
| 4,213,480 A | 7/1980 | Orum |
| 4,406,303 A | 9/1983 | Kilmoyer |
| 4,876,945 A | 10/1989 | Stoll et al. |
| 4,877,217 A | 10/1989 | Peil |
| 5,012,854 A | 5/1991 | Bond |
| 5,039,061 A | 8/1991 | Heard et al. |
| 5,103,172 A | 4/1992 | Stoll |
| 5,320,325 A | 6/1994 | Young |
| 5,407,172 A * | 4/1995 | Young ................ E21B 33/062 137/554 |
| 2008/0040070 A1 | 2/2008 | McClanahan |
| 2011/0297255 A1* | 12/2011 | Weingarten ......... F16K 17/0453 137/535 |
| 2012/0001101 A1 | 1/2012 | Dietz |

FOREIGN PATENT DOCUMENTS

| | | |
|---|---|---|
| GB | 2275706 A | 9/1994 |
| GB | 2331574 A | 5/1999 |
| RU | 40380 | 9/2004 |
| RU | 2241113 | 11/2004 |
| WO | 0194796 | 12/2001 |

OTHER PUBLICATIONS

Search Report from corresponding EA Application No. 201201542, dated Apr. 24, 2013.
Unofficial English Translation of Mexican Office Action issued in connection with corresponding MX Application No. MX/a/2012/014450 dated Mar. 25, 2015.
Unofficial English Translation of Chinese Office Action issued in connection with corresponding CN Application No. 201210537599.3 dated Mar. 15, 2016.

\* cited by examiner

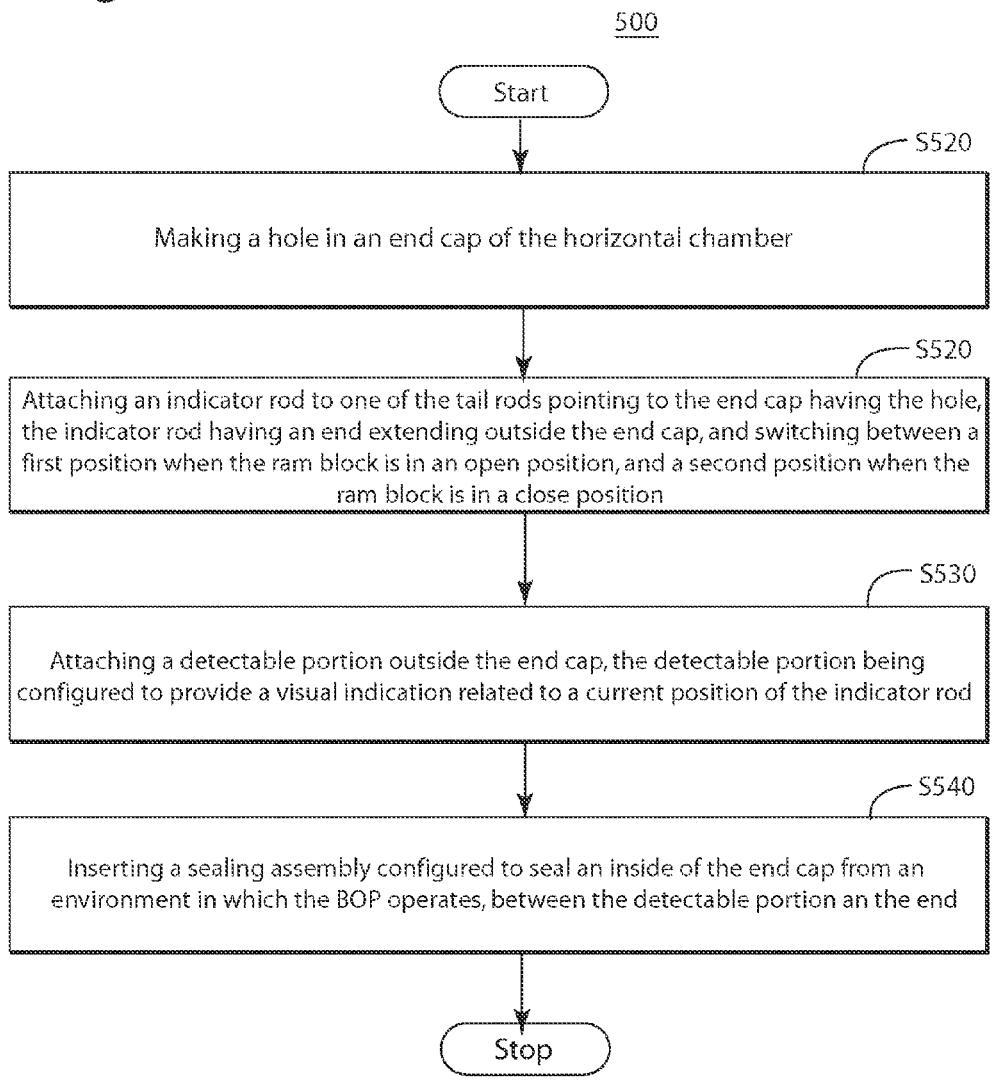

VISUAL RAM POSITION INDICATOR APPARATUSES AND METHODS

CROSS-REFERENCE TO RELATED APPLICATIONS

This application is a continuation of U.S. patent application Ser. No. 13/324,029, which was filed on Dec. 13, 2011, the full disclosure of which is hereby incorporated herein by reference in its entirety.

BACKGROUND OF THE INVENTION

1. Technical Field

Embodiments of the subject matter disclosed herein generally relate to apparatuses configured to provide a visual indication outside a blowout preventer (BOP), relative to a current position of ram blocks inside the BOP, and methods of adding such apparatuses to new or existing blowout preventers.

2. Discussion of the Background

Oil and gas extraction remains a critical component of the world economy in spite of increasing challenges regarding the accessibility and the safety of oil and gas exploitation. The drilling at offshore locations to extract oil and gas from under the sea floor is performed at ever increasing water depths.

A traditional offshore oil and gas installation 10, as illustrated in FIG. 1, includes a platform 20 (of any other type of vessel at the water surface) connected via a riser 30 to a wellhead 40 on the seabed 50. It is noted that the elements shown in FIG. 1 are not drawn to scale and no dimensions should be inferred from relative sizes and distances illustrated in FIG. 1.

A subsea blowout preventer stack (BOP) 60 is located close to the seabed 50, and may include a lower BOP stack 62 attached to the wellhead 40, and a Lower Marine Riser Package ("LMRP") 64, which is attached to a distal end of the riser 30. During regular operation the lower BOP stack 62 and the LMRP 64 are connected. BOPs 66 located in the lower BOP stack 62 or in the LMRP 64 are in an open state during normal operation, but may be closed (i.e., switched in a close state) to interrupt a fluid flow through the riser 30. Electrical cables and/or hydraulic lines 70 transport control signals from the drilling platform 20 to a controller 80, which is disposed on the BOP stack 60. The controller 80 controls the BOPs 66 to be in the open state or in the close state, according to signals received from the platform 20 via the electrical cables and/or hydraulic lines 70. The controller 80 also acquires and sends to the platform 20, information related to the current state (open or closed) of the BOPs.

During drilling, gas, oil or other well fluids at a high pressure may burst from the drilled formations into riser. When such an event (which is sometimes referred to as a "kick" or a "blowout") occurs at unpredictable moments, if the burst is not promptly controlled, the well and/or the equipment of the installation may be damaged. The BOPs are installed to seal the well when a blowout event occurs. Although the above discussion was directed to a subsea well, the same is true for wells on the ground.

A conventional BOP, as illustrated in FIG. 2, is essentially a valve configured to stop high pressure fluid flowing from the well into the riser 30. The BOP 100 in FIG. 2 (which can be any of the BOPs 66 in the subsea BOP stack 60) has a body 110 inside which two substantially perpendicular chambers 120 and 130 intersect. The first chamber 120 (vertical bore) connects to and is aligned with the riser 30.

The second chamber 130 houses two ram blocks 140 that are configured to move along an x-axis, which is perpendicular to the riser 30, the ram blocks 140 being pushed by respective piston rods 150 towards each other. Tail ends 160 of the piston rods 150 are respectively hosted inside end caps 170 of the body 110. This type of BOP (which has ram blocks) is known as a ram BOP.

During regular operation, the BOP 100 is in an open state, the ram blocks 140 being located at respective open positions, outside a space where the first chamber 120 intersects with the second chamber 130. When a kick event occurs, upon receiving a command from the controller 80, the ram blocks 140 move towards each other to close positions at which the ram blocks 140 are in contact, face-to-face with each other, inside the second chamber 130. When the ram blocks 140 reach the close positions the fluid flow passing therethrough is severed. The BOP 100 is then in a close state.

The controller 80 reports the state of the BOP 100 to the platform 20 by sending signals along the cables 70. However, when accidents occur, the cables 70 may become interrupted or the controller 80 may be damaged, and, therefore, it may become unknown by operators on the platform 20, whether a BOP had received the control signal and switched to a close state, or remained in an open state. Information about the state of the BOPs may be critical for preventing spills or for containing the spills of fluid bursting from the wellhead 40. Conventionally, this information cannot be retrieved if the normal information path is interrupted (e.g., if the cables 70 and/or the controller 80 are damaged).

Accordingly, it would be desirable to equip the BOPs with apparatuses providing visual indications outside the BOP relative to the current position of the ram blocks inside the BOPs, to be able to determine the state of the BOP by performing a visual inspection outside the BOP, for example, using a remote operational vehicle (ROV) equipped with an underwater video camera.

It would also be desirable to modify the conventional BOPs to include such visual indicators, thereby avoiding a situation in which the state of the BOP is not known and cannot be determined. Moreover, it would be desirable that such indicators to be independent of any source of power so that they will provide the information about the ram blocks even if such a source of power may become unavailable.

SUMMARY OF THE INVENTION

According to one exemplary embodiment, an apparatus for providing a visual indication outside a ram blowout preventer is provided. The apparatus includes an indicator rod having an end extending outside an end cap of the BOP, and configured to engage with a tail rod inside the BOP, and to switch between a first position when the BOP is in an open state, and a second position when the BOP is in a close state. The apparatus further includes a detectable portion located outside the end cap and configured to provide a visual indication relative to a current position of the indicator rod, and a sealing assembly configured to seal a space inside the end cap from an environment in which the BOP operates.

According to one exemplary embodiment, a ram blowout preventer has a BOP body having a vertical chamber aligned with a riser and a horizontal chamber substantially perpendicular to and intersecting the vertical chamber, two ram blocks configured to move along the horizontal chamber between an open position in which the ram blocks are located outside the vertical chamber and a close position in which the ram block move to be face-to-face inside the vertical chamber, thereby severing a fluid flow passing therethrough, tail rods attached respectively to each of the ram blocks opposite to a side towards another one of the ram blocks, and pointing towards an end cap of the horizontal chamber, and a ram position indicator apparatus configured to indicate a state of the ram BOP. The ram position indicator apparatus includes an indicator rod configured to engage with the tail rod, having an end extending outside the end cap, and switching between a first position when the ram block is in the close position, and a second position when the ram block is in the open position. The ram position indicator apparatus further includes a detectable portion located outside the end cap and configured to provide a visual indication related to a current position of the indicator rod, and a sealing assembly configured to seal an inside of the end cap from an environment in which the BOP operates.

According to another exemplary embodiment, a method of adding a ram position indicator apparatus to a ram BOP having (i) a BOP body with a vertical chamber aligned with a riser and a horizontal chamber substantially perpendicular to and intersecting the vertical chamber, (ii) two ram blocks configured to move along the horizontal chamber between respective open positions when the ram blocks are outside the vertical chamber, and respective close positions when the ram block are face-to-face inside the vertical chamber, thereby severing a fluid flow passing therethrough, and (iii) tail rods attached respectively to each of the ram blocks opposite to a side towards another one of the ram blocks, and pointing towards respective end caps of the horizontal chamber is provided. The method includes making a hole in an end cap of the horizontal chamber and attaching an indicator rod to one of the tail rods pointing to the end cap having the hole, the indicator rod having an end extending outside the end cap, and switching between a first position when the ram block is in an open position, and a second position when the ram block is in a close position. The method further includes attaching a detectable portion outside the end cap, the detectable portion being configured to provide a visual indication related to a current position of the indicator rod, and inserting a sealing assembly configured to seal an inside of the end cap from an environment in which the BOP operates, between the detectable portion and the end cap.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 7 is a flow chart illustrating a method for adding a ram position indicator apparatus to a ram BOP according to another exemplary embodiment.

DETAILED DESCRIPTION OF THE PREFERRED EMBODIMENT

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of drilling systems equipped with blowout preventers. However, the embodiments to be discussed next are not limited to these systems, but may be applied to other systems that use ram type valves.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As discussed in the background section, situations in which information regarding the state of a BOP is not gathered or not transmitted to an operator at the surface may occur during drilling or exploitation of a well. Knowing whether a ram blowout preventer is in a close state or in an open state may be critical to avoiding or limiting spills in the environment. An apparatus providing a visual indication outside the BOP relative to the current state of the BOP may be provided to one or both end caps of a horizontal chamber of a BOP. However, since the movement of the ram blocks is usually symmetric with respect to an axis of the riser they are configured to close, an indicator related to one of the ram blocks may suffice.

Figure 1:
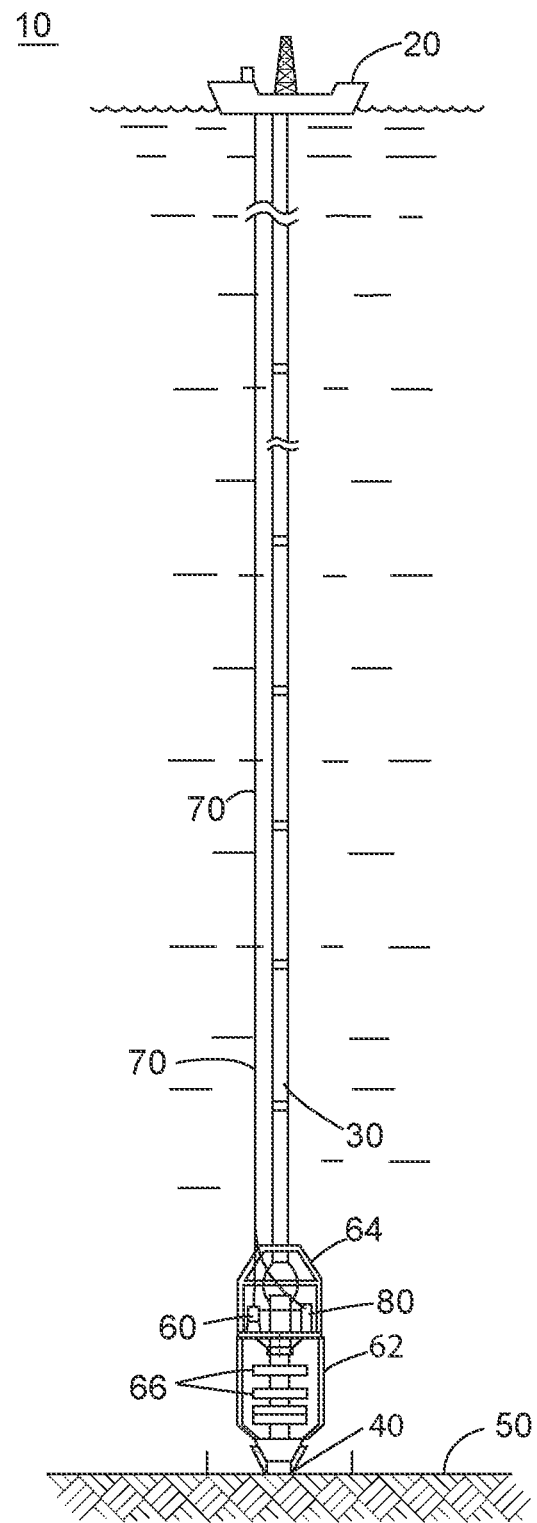
FIG. 1 is a schematic diagram of a conventional offshore rig.
Figure 2:
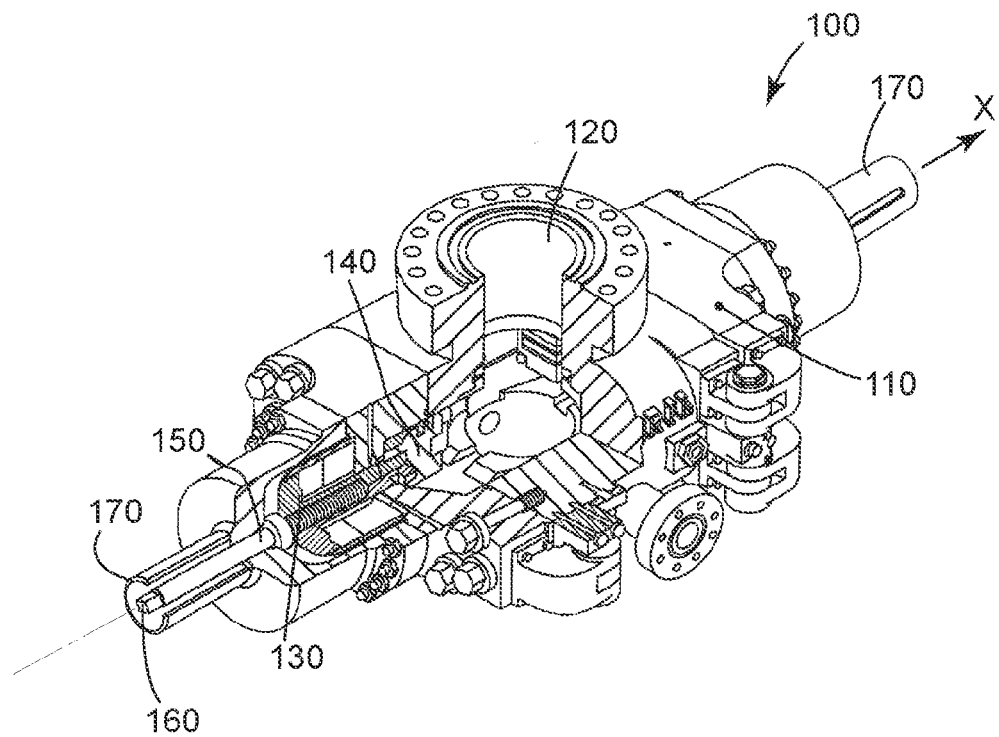
FIG. 2 is a schematic diagram of a conventional BOP.
Figure 3A:
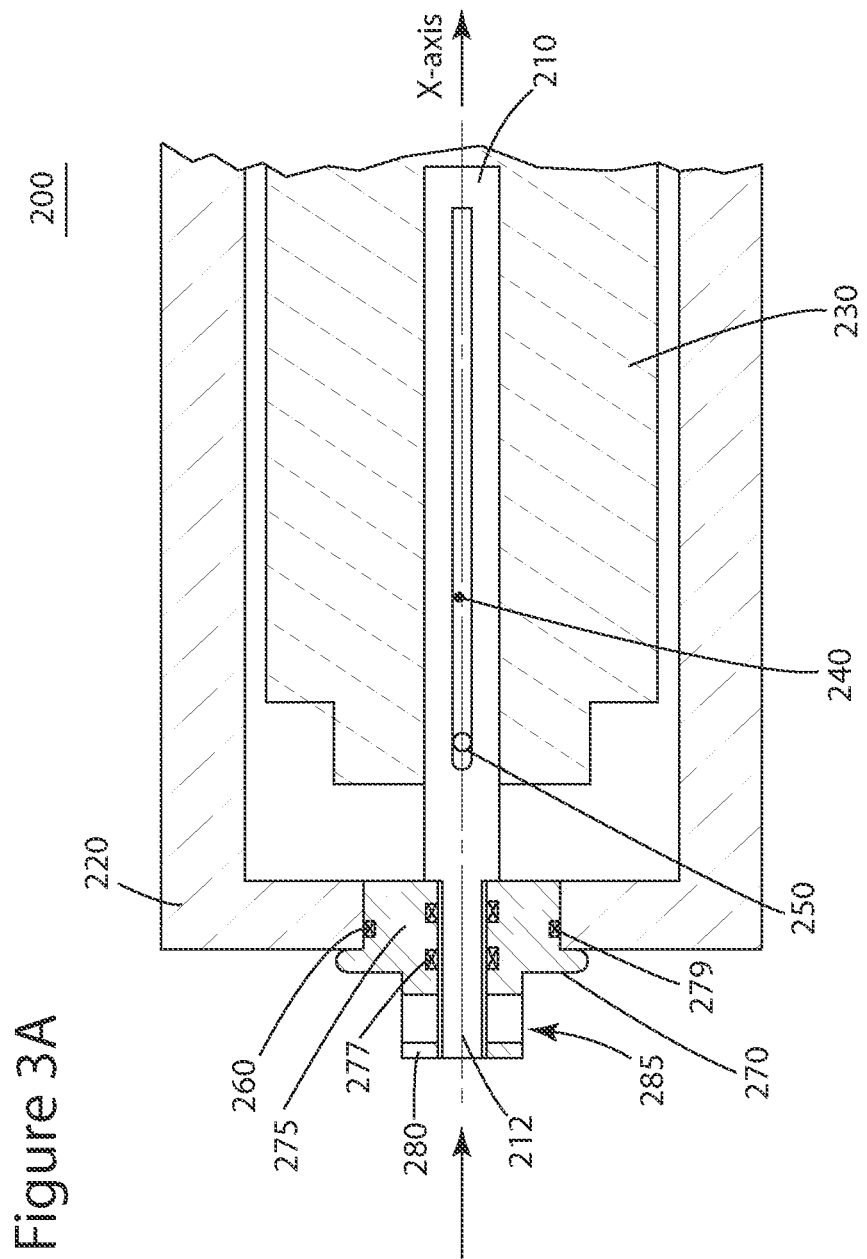
FIGS. 3A and 3B are schematic diagrams of a BOP with an apparatus according to an exemplary embodiment, in an open state and in a close state respectively.
Figure 3B:
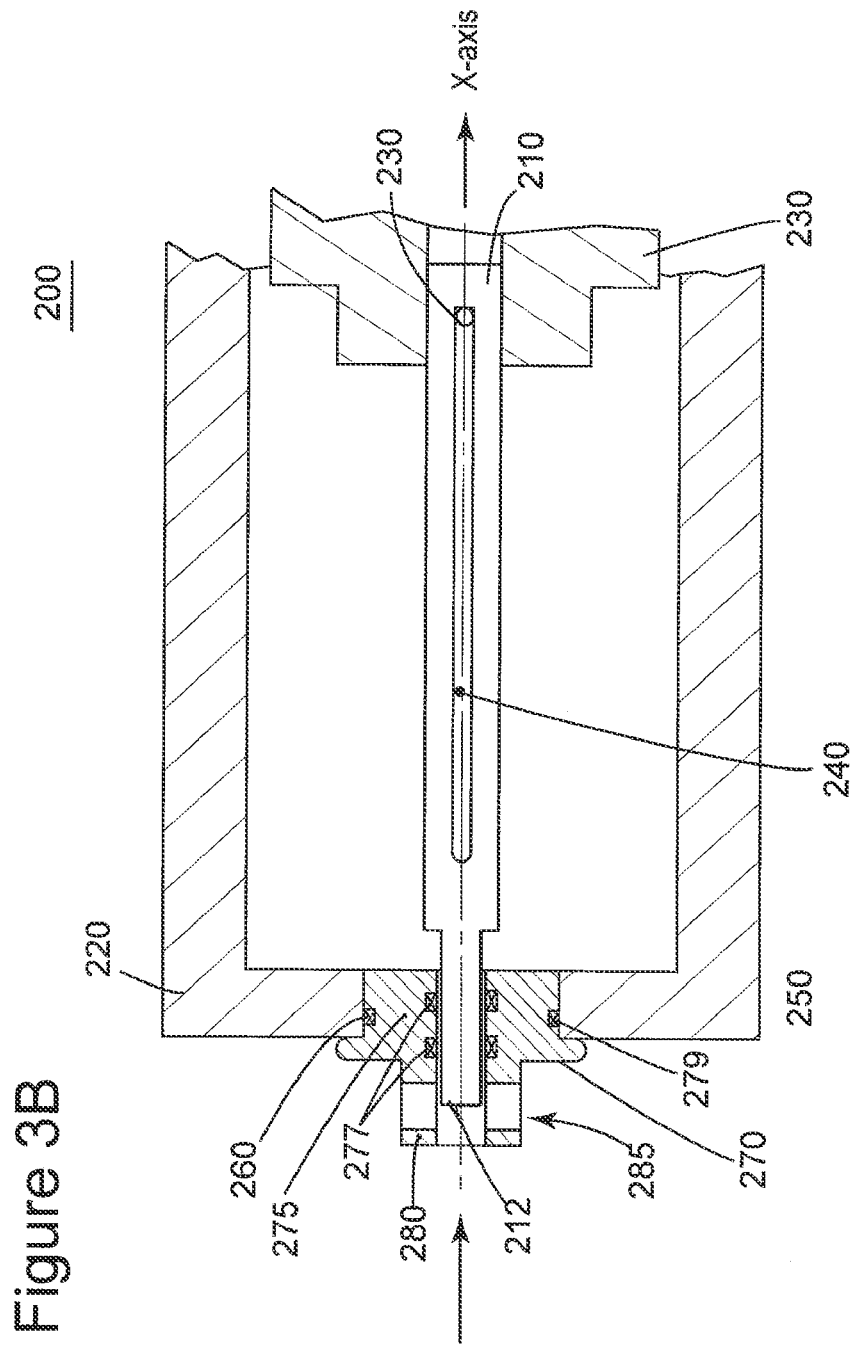

According to an exemplary embodiment illustrated in FIGS. 3A and 3B, a BOP 200 has an apparatus for providing a visual indication outside the BOP relative to the current state of the BOP. The BOP 200 may have a structure and operation similar to the conventional BOP 100 except in a portion which is represented in detail in FIGS. 3A and 3B. The apparatus for providing a visual indication outside the BOP has an indicator rod 210. The indicator rod 210 is configured to engage with the tail rod 230. The term "tail rod" is used instead of a tail end (e.g., 160 in FIG. 2) of a piston rod (e.g., 150 in FIG. 2). Thus, the tail rod 230 moves together with a ram block (e.g., 140 in FIG. 2) inside the BOP 200. The indicator rod 210 moves parallel with the x-axis between a first position illustrated in FIG. 3A, when the BOP 200 is in an open state, and a second position illustrated in FIG. 3B, when the BOP 200 is in a close state. An end 212 of the indicator rod 210 extends outside the end cap 220 of the BOP 200 in the open state.

When the BOP 200 switches from the open state illustrated in FIG. 3A to the close state illustrated in FIG. 3B, the tail rod 230 moves for a significant distance corresponding to movement of the ram block (e.g., for about 18 inches). It would be impractical to have the indicator rod 210 move for the same length. In order to have the indicator rod 210 moving for a shorter distance, the indicator rod 210 is configured to have a longitudinal slot 240 substantially parallel with the x-axis. A pin 250 extending from an outer surface of the tail rod 230 is configured to slide along the longitudinal slot 240 making the indicator rod 210 to move together with the tail rod 230 (and with the respective ram block) only for an end portion of the movement of the tail rod 230. The length of the longitudinal slot 240 is a difference between a length of the movement of the tail rod 230, and a length of the movement of the indicator rod 210. Due to this manner of engaging the indicator rod 210 with the tail rod 230, the length of the movement of the indicator rod 210 is much shorter than the length of the movement of the tail rod 230 (e.g., may be only about 1 inch).

Unlike in the conventional BOP 100, the end cap 220 has a hole 260 in order to allow the indicator rod 210 to extend outside the end cap 220, and, thus, to become visible outside the BOP. A sealing assembly 270 is configured to seal a space inside the end cap 220 from an environment in which the BOP operates, for example, sea water. The sealing assembly 270 includes a seal housing 275 and seals 277, 279. The seal housing 275 is configured to fit inside the hole 260 of the end cap 220 and to surround the indicator rod 210, close to the end 212 thereof. A seal 279 seals an interface between the seal housing 275 and the end cap 230. Two seals 277 seal an interface between the indicator rod 210 and the seal housing 275. The number of seals is not limited to the number of seals in the illustrated embodiment. However, since the indicator rod 210 moves relative to the seal housing 275, the seals 277 have to ensure a dynamic seal, while the seal 279 has to ensure only a static seal.

Further, outside the end cap 230, a detectable portion 280 is configured to provide a visual indication relative to a current position of the indicator rod 210. The detectable portion 280, which may be an open end tube, has one or more transparent slots 285 enabling an observer to see the indicator rod 230 therethrough when the indicator rod 210 is in the first position. Thus, when the BOP is in the close state, the indicator rod 210 is not visible through the slot(s) 285, and when the BOP is in the open state, the indicator rod 210 is visible through the slot(s) 285. The detectable portion 280 may be formed as a single piece with the seal housing 275.

The indicator rod 210, the seal assembly 270 and the detectable portion 280 are components that when added to a conventional BOP having the tail rod 230 and the end cap 220 adapted to receive them provide a visual indication outside the BOP relative to the current state of the BOP.

Figure 4:
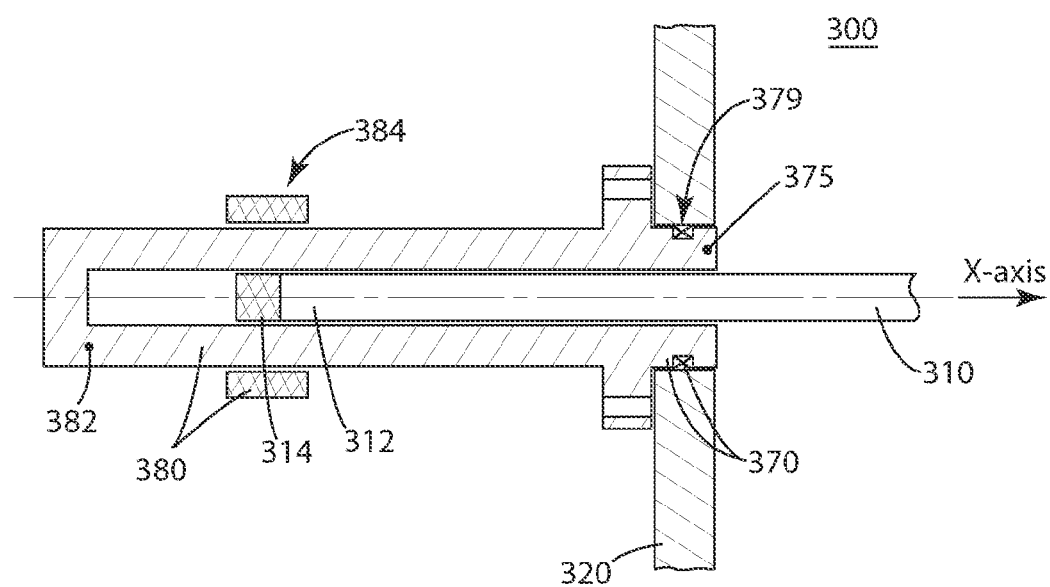
FIG. 4 is a schematic diagram of a BOP with an apparatus according to another exemplary embodiment.

An alternative embodiment illustrated in FIG. 4 is a BOP 300 whose indicator rod 310, seal assembly 370 and detectable portion 380 differ from those of the BOP 200, the manner in which the state of the BOP is visually indicated outside the BOP being different. The indicator rod 310 has a slot and attaches to the tail rod similar with the rod indicator 210. At the end 312 of the indicator rod 310 that extends outside the end cap when the BOP is in the open state, there is a permanent magnet 314. The detectable portion 380 includes a tube 382 made of a non-magnetic material (e.g., stainless steel), the tube being closed at a distal end relative to the end cap. The tube 382 may be formed together as one piece or attached to a seal housing 375. The detectable portion 380 also includes a magnetic indicator 384 made of carbon steel or a magnetic material, disposed in the proximity of the non-magnetic tube. The magnetic indicator 384 provides a visual indication when the magnet 314 of the indicator rod 310 is located at the same position along the x-axis, inside the tube 382.

Unlike in the embodiment in FIGS. 3A and 3B, the seal assembly 370 of the BOP 300 includes only seals 379 configured to provide a static seal at the interface between the end cap 320 and the seal housing 375, the indicator rod 310 moving freely through the seal housing 375. A space inside the detectable portion 380 is in communication with the space inside the end cap.

Figure 5:
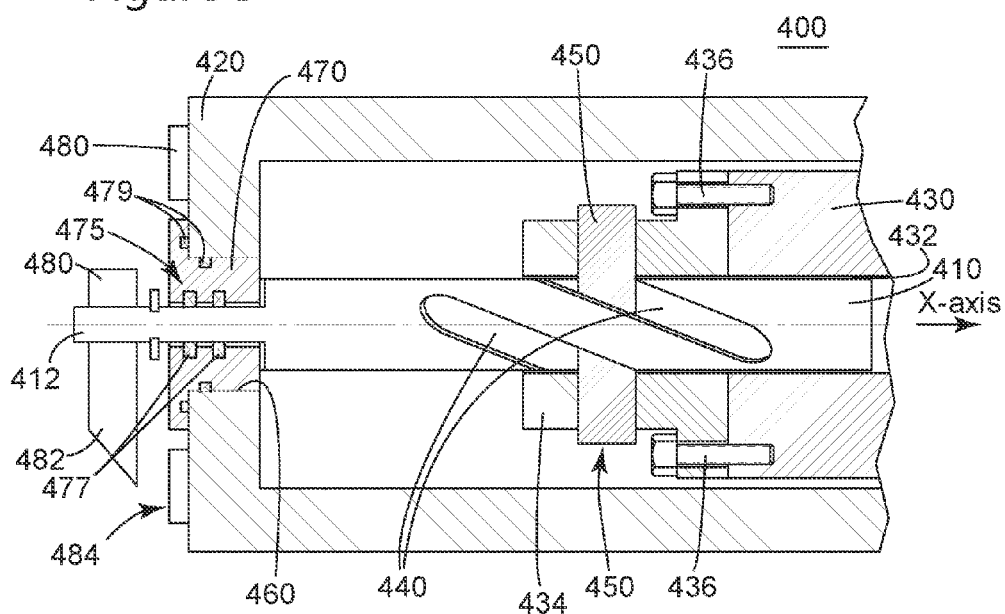
FIG. 5 is a schematic diagram of a BOP with an apparatus according to another exemplary embodiment.
Figure 6:
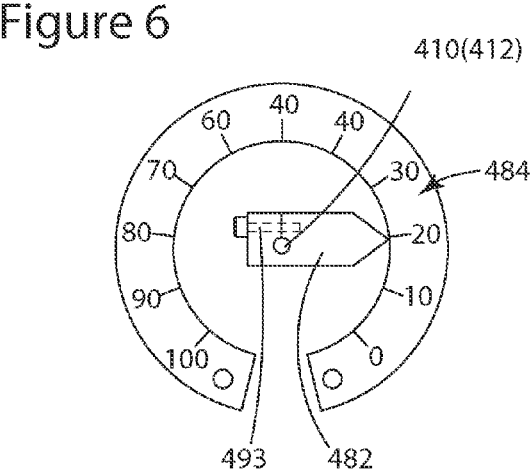
FIG. 6 is a view of a dial indicator attached to an end cap according to an exemplary embodiment.

The embodiments described above while referring to FIGS. 3 and 4 are configured to indicate only whether the BOP is in the open state or in the close state. However, the ram blocks may be in intermediary positions, between close positions and open positions. FIGS. 5 and 6 refer to another embodiment in which an actual position of the ram blocks is indicated in a range from 0-100% between the open position (open state) and close position (close state). Thus, the BOP 400 in FIG. 5 has an apparatus for providing a visual indication outside the BOP relative to a current position of the ram block to which the apparatus is attached (which may be the same as the current position of the other ram block of the BOP). An indicator rod 410 has one end 412 outside the end cap 420. The indicator rod 410 is attached to the tail rod 430 such that the indicator rod 410 rotates depending on a position of the tail rod 430 along the x-axis. Specifically, the indicator rod 410 has helical slots 440 (two helical slots are illustrated, but at least one is necessary and embodiments may have more than two). The tail rod 430 has a hole 432 allowing the indicator rod 410 to slide therein depending on the relative positions of the indicator rod 410 and the tail rod 430. At the end of the tail rod 430 towards the end cap 420, a pin retainer 434 may be mounted, for example, using screws 436 to be fixedly connected to the tail rod 430. The pin retainer 434 provides pins 450 corresponding to the helical slots 440 on the indicator rod 410. When that tail rod 430 moves along the x-axis, the pins 450 slide along respective helical slots 440 making the indicator rod 410 to rotate while maintaining its location along the x-axis.

Outside the end cap 420, the indicator rod 410 is connected to a detectable portion 480. The detectable portion 480 includes (i) a dial pointer 482 that is fixedly attached to the indicator rod 410, e.g., by using a screw 483, and (ii) an indicator dial 484 that is mounted on the end cap 420. The detectable portion 480 allows an observer to collect information about the ram position inside the BOP 400 based on a projection of the dial pointer 482 on the indicator dial 484 as illustrated in FIG. 6.

For the BOP 400, a sealing assembly 470 includes a seal housing 475 configured to be mounted in a hole 460 of the end cap 430 and to surround the indicator rod 410. The sealing assembly 470 also includes one or more seals 479 configured to statically seal an interface between the seal housing 475 and the end cap 430, and one or more seals 477 configured to dynamically seal an interface between the indicating rod 410 and the seal housing 475, while allowing the indicator rod 410 to rotate.

An advantage of some of the embodiments is that due to their mechanical nature no power source is required. Therefore, the visual indication occurs and may be maintained indefinitely.

A ram position indicator as illustrated in FIGS. 3-6 may be added to a conventional ram BOP as the one illustrated in FIG. 2. The flow diagram of a method 500 of adding a ram position indicator apparatus to a ram BOP is illustrated in FIG. 7. The method 500 includes making a hole in an end cap of the horizontal chamber at 5510. Further, at 5520, the method 500 includes attaching an indicator rod to one of the tail rods pointing to the end cap having the hole, the indicator rod having an end extending outside the end cap, and switching between a first position when the ram block is in an open position, and a second position when the ram block is in a close position. In this step, one or more pins may be attached to the respective tail rod. The indicator rod may have a longitudinal slot substantially parallel with a horizontal direction along which the indicator rod moves between the first position and the second position, the longitudinal slot being configured to engage with a pin located on an outer surface of the tail rod. Alternatively, the indicator rod may be configured to rotate between the first position and the second position, the indicator rod having one or more helical slots configured to engage with corresponding pins attached to the tail rod.

Then at S530, the method 500 includes attaching a detectable portion outside the end cap, the detectable portion being configured to provide a visual indication related to a current position of the indicator rod. The detectable portion may have an open end tube connected to the end cap via a sealing assembly, and having at least one lateral transparent slot enabling viewing the indicator rod in the first position, extending outside the end cap. Alternatively, the detectable portion may include (i) a tube made of non-magnetic material, configured to fit in a hole of the end cap allowing the indicator rod to slide outside the end cap, and a closed end which is opposite to the one end, and (ii) a magnetic indicator placed outside but near the tube and configured to provide a visual indication when the magnet is nearby, the indicator rod in the second position having the magnet located inside the tube at substantially the same longitudinal position as the magnetic indicator which then provides the visual indication. In another embodiment, the detectable portion includes (i) a dial pointer fixedly attached to the end of the indicator rod which extends outside the end cap, and configured to point towards different directions, and (ii) an indicator dial attached to the end cap and marked to quantify, as a percentage, the direction pointed at by the dial pointer, which direction is correlated with the current position of the indicator rod, the first position corresponding to 0% and the second position corresponding to 100%.

Finally, at 5540, the method 500 includes inserting the sealing assembly configured to seal an inside of the end cap from an environment in which the BOP operates, between the detectable portion and the end cap. The sealing assembly may include a seal housing configured to fit inside the hole of the end cap, to connect with the detectable portion, and to surround the indicator rod, and various seals to seal statically an interface between the seal housing and the end cap, and possibly also to seal dynamically an interface between the indicating rod and the seal housing, while allowing the indicator rod to slide or rotate.

Another apparatus similar to or different from the apparatus installed at one end cap may be installed at the other end cap by making another hole in the other end cap of the horizontal chamber, attaching indicator rod to another one of the tail rods which points to the another end cap, attaching another detectable portion outside the another end cap, and inserting another sealing assembly between the other detectable portion and the other end cap.

The disclosed exemplary embodiments provide apparatuses for providing a visual indication outside a BOP relative to a position of ram blocks inside the BOP, and methods of adding such apparatuses to existing blowout preventers. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using apparatuses and performing any incorporated methods. The patentable scope of the subject matter is defined by the claims, and may include other examples that occur to those skilled in the art. Such other examples are intended to be within the scope of the claims.

What is claimed is:

1. An apparatus for providing a visual indication outside a ram blowout preventer (BOP), the apparatus comprising:
an indicator rod having an end extending outside an end cap of the BOP and exposed to fluid pressure of the environment outside the BOP, the indicator rod configured to engage with a tail rod inside the BOP, and to rotate between a first position when the BOP is in an open state, and a second position when the BOP is in a closed state, the indicator rod having one or more helical slots configured to engage with one or more pins attached to the tail rod;
a dial pointer attached to the end of the indicator rod which extends outside the end cap, and configured to point towards different directions;
an indicator dial attached to the end cap and marked to quantify a direction pointed at by the dial pointer, which direction is correlated with the current position of the indicator rod; and
a sealing assembly configured to seal a space inside the end cap from an environment in which the BOP operates.

2. The ram position indicator apparatus of claim 1, wherein the indicator dial is marked to quantify, as a percentage, a direction pointed at by the dial pointer, which direction is correlated with the current position of the indicator rod, the first position corresponding to 0% and the second position corresponding to 100%.

3. The ram position indicator apparatus of claim 1, wherein the indicator dial is marked to quantify, as a percentage, a direction pointed at by the dial pointer, which direction is correlated with the current position of the indicator rod, the first position being the closed position and corresponding to about 0%, with additional indicator marks in the positive and negative directions for visual indication showing over or under stroke positions.

4. The ram position indicator apparatus of claim 3, wherein the second position is the open position and corresponds to 100%.

5. The ram position indicator apparatus of claim 1, wherein the sealing assembly comprises:
a seal housing configured to fit inside a hole of the end cap, and to surround the indicator rod;
at least one seal configured to seal an interface between the seal housing and the end cap; and
one or more seals configured to seal an interface between the indicating rod and the seal housing, while allowing the indicator rod to rotate.

6. The ram position indicator apparatus of claim 1, further comprising:

a pin retainer configured to be attached to the tail rod by one or more screws and to hold the one or more pins configured to slide around the one or more helical slots of the indicator rod.

7. A method of adding a ram position indicator apparatus to a ram BOP having
(i) a BOP body with a vertical chamber aligned with a riser and a horizontal chamber substantially perpendicular to and intersecting the vertical chamber,
(ii) first and second ram blocks configured to move along the horizontal chamber between respective open positions when the ram blocks are outside the vertical chamber, and respective closed positions when the ram blocks are face-to-face inside the vertical chamber, thereby severing a fluid flow passing therethrough, and
(iii) first and second tail rods attached respectively to each of the first and second ram blocks on opposite sides of the vertical chamber, and pointing towards respective first and second end caps of the horizontal chamber, the method comprising:
(a) making a hole in a first end cap of the horizontal chamber;
(b) attaching a first indicator rod to the first tail rod pointing to the first end cap, the first indicator rod having an end extending outside the first end cap and exposed to fluid pressure of the environment outside the BOP, the first indicator rod rotating between a first position when the first ram block is in an open position, and a second position when the first ram block is in a closed position, the first indicator rod having one or more helical slots configured to engage with corresponding one or more pins attached to the first tail rod;
(c) attaching a first detectable portion outside the first end cap, the first detectable portion being configured to provide a visual indication related to a current position of the first indicator rod, the first detectable portion comprising:
a first dial pointer attached to the end of the first indicator rod that extends outside the first end cap, and configured to point towards different directions; and a first indicator dial attached to the first end cap and marked to quantify a direction pointed at by the first dial pointer, which direction is correlated with the current position of the first indicator rod; and
(d) inserting a first sealing assembly configured to seal an inside of the first end cap from an environment in which the BOP operates, between the first detectable portion and the first end cap.

8. The method of claim 7, wherein the first sealing assembly comprises:
a first seal housing configured to fit inside the hole of the first end cap, to connect with the first detectable portion, and to surround the first indicator rod; at least one seal configured to seal an interface between the first seal housing and the first end cap; and one or more seals configured to seal an interface between the first indicating rod and the first seal housing, while allowing the first indicator rod to slide relative to the first seal housing.

9. The method of claim 8, wherein the one or more seals is configured to seal an interface between the first indicating rod and the first seal housing.

10. The method of claim 7, wherein the first indicator dial is marked to quantify, as a percentage, a direction pointed at by the first dial pointer, which direction is correlated with the current position of the first indicator rod, the first position corresponding to 0% and the second position corresponding to 100%.

11. The method of claim 7, wherein the first indicator dial is marked to quantify, as a percentage, a direction pointed at by the first dial pointer, which direction is correlated with the current position of the first indicator rod, the first position corresponding to about 0%, with additional indicator marks in the positive and negative directions for visual indication showing over or under stroke positions.

12. The method of claim 7, further comprising:
making a hole in the second end cap of the horizontal chamber;
attaching a second indicator rod to the second tail rod which points to the second end cap, the second indicator rod having an end extending outside the second end cap, and rotating between a first position when the first and second rams blocks are in the closed position, and a second position when the first and second ram blocks are in the open position, the second indicator rod having one or more helical slots configured to engage with one or more pins attached to the second tail rod;
attaching a second detectable portion outside the second end cap, the second detectable portion configured to provide a visual indication related to a current position of the second indicator rod; and
inserting a second sealing assembly configured to seal an inside of the second end cap from the environment in which the BOP operates, between the second detectable portion and the second end cap.

13. The method of claim 12, the second detectable portion comprising:
a second dial pointer attached to the end of the second indicator rod that extends outside the second end cap, and configured to point towards different directions; and
a second indicator dial attached to the second end cap and marked to quantify a direction pointed at by the second dial pointer, which direction is correlated with the current position of the second indicator rod.

14. The method of claim 12, wherein the second sealing assembly comprises:
a second seal housing configured to fit inside the hole of the second end cap, to connect with the second detectable portion, and to surround the second indicator rod; at least one seal configured to seal an interface between the second seal housing and the second end cap; and one or more seals configured to seal an interface between the second indicating rod and the second seal housing, while allowing the second indicator rod to slide relative to the second seal housing.

15. The method of claim 14, wherein the one or more seals is configured to seal an interface between the second indicator rod and the second seal housing.

16. The method of claim 12, wherein the second indicator dial is marked to quantify, as a percentage, a direction pointed at by the second dial pointer, which direction is correlated with the current position of the second indicator rod, the first position corresponding to 0% and the second position corresponding to 100%.

17. The method of claim 12, wherein the second indicator dial is marked to quantify, as a percentage, a direction pointed at by the second dial pointer, which direction is correlated with the current position of the second indicator rod, the first position corresponding to about 0%, with additional indicator marks in the positive and negative directions for visual indication showing over or under stroke positions.

\* \* \* \* \*